United States Patent
Penny

(10) Patent No.: US 7,918,356 B2
(45) Date of Patent: *Apr. 5, 2011

(54) PREFORM AND CONTAINER HAVING THREAD GROOVE

(75) Inventor: Michael E. Penny, Saline, MI (US)

(73) Assignee: Amcor Limited, Abbotsford, Victoria (AU)

( * ) Notice: Subject to any disclaimer, the term of this patent is extended or adjusted under 35 U.S.C. 154(b) by 994 days.

This patent is subject to a terminal disclaimer.

(21) Appl. No.: 11/698,009

(22) Filed: Jan. 25, 2007

(65) Prior Publication Data

US 2007/0175855 A1 Aug. 2, 2007

Related U.S. Application Data

(60) Provisional application No. 60/763,203, filed on Jan. 27, 2006.

(51) Int. Cl.
*B65D 1/02* (2006.01)
*B65D 39/08* (2006.01)
*B29D 22/00* (2006.01)

(52) U.S. Cl. ........ 215/44; 215/329; 220/288; 428/542.8

(58) Field of Classification Search ............... 215/40, 215/42–45, 250, 252, 329; 220/288; 428/542.8
See application file for complete search history.

(56) References Cited

U.S. PATENT DOCUMENTS

| | | | |
|---|---|---|---|
| 3,497,096 A | 2/1970 | Smith et al. | |
| 3,757,487 A | 9/1973 | Fauth | |
| 4,005,799 A | 2/1977 | Mannaerts | |
| 4,896,782 A * | 1/1990 | Hawkins et al. | 215/329 |
| 4,993,571 A * | 2/1991 | Conti | 215/252 |
| 5,533,633 A | 7/1996 | King | |
| 5,702,014 A | 12/1997 | Nielsen | |
| 5,845,798 A | 12/1998 | Carrier | |
| 6,415,935 B1 | 7/2002 | Hins | |
| 6,561,369 B1 * | 5/2003 | Clodfelter et al. | 215/44 |
| 6,989,124 B2 * | 1/2006 | Miller et al. | 264/318 |
| 2005/0205575 A1 | 9/2005 | Kobayashi et al. | |
| 2007/0175854 A1* | 8/2007 | Penny | 215/383 |

FOREIGN PATENT DOCUMENTS

| | | |
|---|---|---|
| WO | WO94/22734 | 10/1994 |
| WO | WO 2004041669 A1 * | 5/2004 |
| WO | WO2005/097610 | 10/2005 |

* cited by examiner

*Primary Examiner* — Sue A Weaver

(57) ABSTRACT

A finish for a plastic container and a preform adapted to be molded into the plastic container. The finish and the preform include an upper portion having a mouth defining an opening into the container. At least one groove is defined around a radial sidewall of the upper portion. The groove slopes gradually downward along the radial sidewall to a terminal end.

19 Claims, 6 Drawing Sheets

PREFORM AND CONTAINER HAVING THREAD GROOVE

CROSS-REFERENCE TO RELATED APPLICATIONS

This application claims the benefit of U.S. Provisional Application No. 60/763,203 filed on Jan. 27, 2006. The disclosure of which is incorporated herein by reference.

TECHNICAL FIELD

This disclosure generally relates to plastic containers for retaining a commodity, and in particular a liquid commodity. More specifically, this disclosure relates to a plastic preform and resultant container having a groove formed in the molded surface where threads of a given closure will ride during capping.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Typically, an upper portion of the plastic container defines an opening. This upper portion is commonly referred to as a finish and includes some means for engaging a cap or closure to close off the opening. In the traditional injection-stretch blow molding process, the finish remains substantially in its injection molded state while the container body is formed below the finish. The finish may include at least one thread extending radially outwardly around an annular sidewall defining a thread profile. In one application, a closure member or cap may define a complementary thread, or threads, that are adapted to cooperatively mate with the threads of the finish. Generally, clockwise rotation of the cap encourages an upper surface of the cap threads to be retained by lower surfaces of the threads on the finish. In some applications, however, external thread profiles formed on the finish may require a non-desirable large amount of material to manufacture.

SUMMARY

Accordingly, the present disclosure provides a finish for a plastic container including an upper portion having a mouth defining an opening into the container. At least one groove is defined around a radial sidewall of the upper portion. The groove slopes gradually downward along the radial sidewall and away from the opening.

A preform adapted to be molded into a plastic container includes an upper portion having a mouth defining an opening into the container. The preform includes at least one groove defined around a radial sidewall of the upper portion. The groove slopes gradually downward along the radial sidewall to a terminal end.

A closure member is adapted to selectively mate with a finish on a container. The closure member includes a lower portion defining an opening and an upper portion defining a cover. At least one thread is formed on an inner surface of a radial sidewall extending between the lower portion and the upper portion.

Additional benefits and advantages of the present disclosure will become apparent to those skilled in the art to which the present disclosure relates from the subsequent description and the appended claims, taken in conjunction with the accompanying drawings.

DETAILED DESCRIPTION

Figure 1:
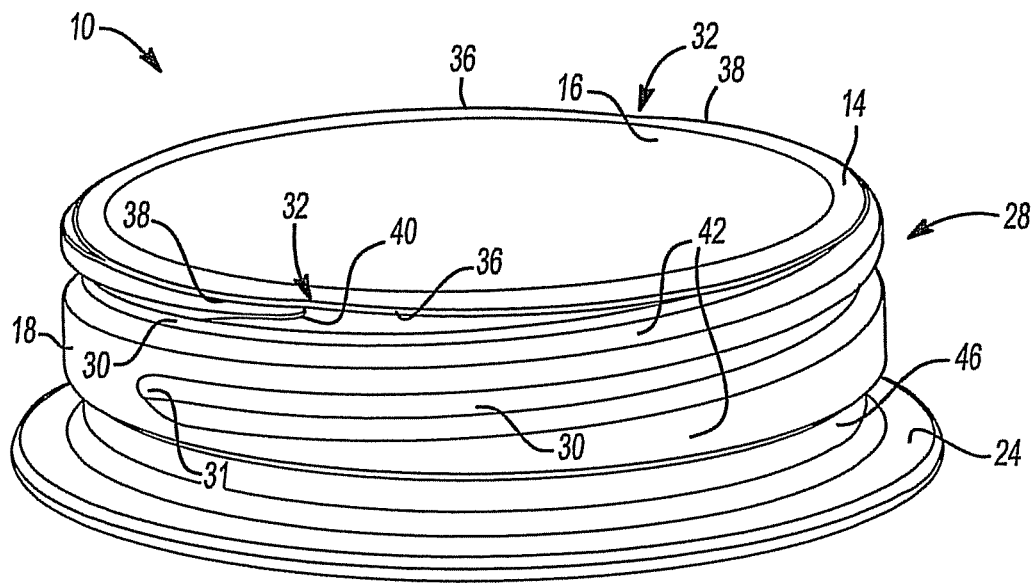
FIG. 1 is a perspective view of a finish of a plastic container constructed in accordance with the teachings of the present disclosure.

The following description is merely exemplary in nature, and is in no way intended to limit the disclosure or its application or uses.

This disclosure provides for a container finish having a significantly reduced weight, while enhancing the interface between a closure member or cap and the container, and meeting filling line temperature and speed demands. Significant weight reductions are achieved through the elimination of material from the container wall of a standard thread profile as well as the elimination of material in other areas of the finish, which represent areas where plastic can be removed without negatively affecting the sealability function of the closure member or cap and the container.

Additionally, a by-product of the disclosed container finish is an improvement to closure function. In this regard, the disclosed finish may be less damaging to frangible connectors incorporated in tamper-evidence closures, reducing the potential for premature closure/tamper-evidence band separation during application. The smoother, more cylindrical finish disclosed provides an opportunity to keep an applied closure member or cap more concentric with the finish, reducing the potential for uneven loading on the frangible connectors which secure the tamper-evidence band to the body of the closure member or cap. Such stability improves tamper-evidence band separation.

Traditionally, the distance between the top seal surface of a container and the start of the container's threads varies slightly during normal production. As this distance varies, it affects the rotational position of an applied closure, and thus the relative location of the tamper-evidence band retention features to the mating features on the finish. The disclosed container finish eliminates the above-mentioned distance and variability, and thereby contributes to improved tamper-evidence band closure performance.

With initial reference to FIGS. 1-4, a finish of a plastic, e.g. polyethylene terephthalate (PET), hot-fillable container is shown and generally identified at reference numeral 10. A closure member or cap 12 (FIG. 9, described in detail later) may be used to selectively mate with the finish 10 in a closed or assembled position. The finish 10 of the present teachings includes a top 14 defining a mouth or opening 16, an annular sidewall 18 and a support ring 24. The opening 16 allows the plastic container to receive a commodity. The annular sidewall 18 generally defines a groove region 28. The groove region 28 provides a means for attachment of the closure member or cap 12. The groove region 28 is formed by a pair of grooves 30 generally defining a helical pattern. Each groove 30 initiates at a groove entrance 32 and sweeps gradually downward about 180 degrees to about 220 degrees around the annular sidewall 18 of the finish 10 to a terminal end 31. Accordingly, the terminal end 31 prevents over torquing of the closure member or cap 12, which could compromise the seal integrity of the closure member or cap 12 of the container. The terminal end 31 also aids in orienting the closure member or cap 12 in relation to the container.

Figure 2:
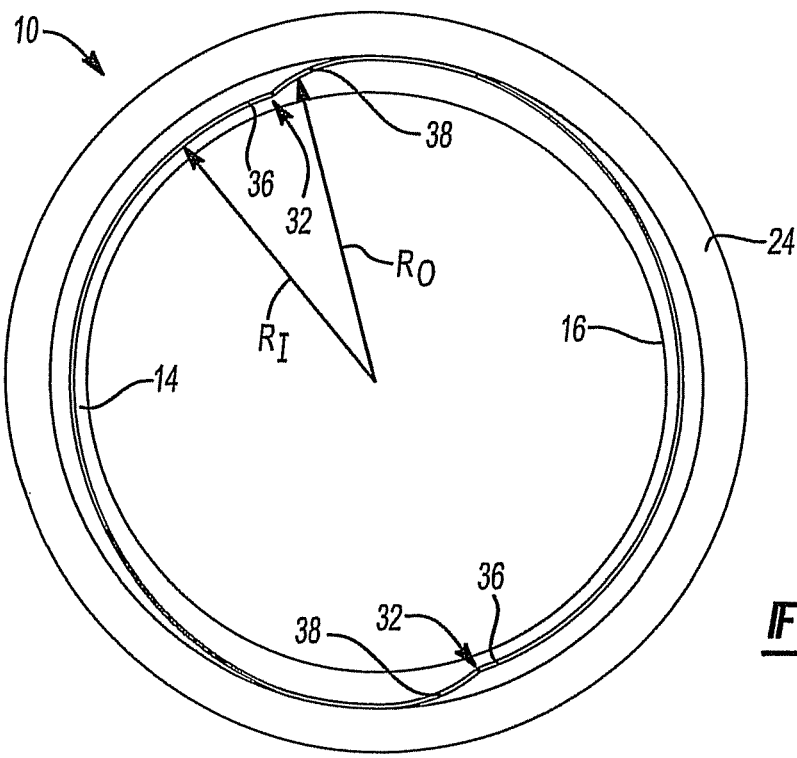
FIG. 2 is a top plan view of the finish of FIG. 1.

The groove entrance 32 is generally defined at an intersection between an inward sweeping radial lip 36 and an outward sweeping radial lip 38. As best illustrated in FIG. 2, the inward sweeping radial lip 36 defines an arcuate path having a decreasing radius $R_I$ that decreases in the clockwise direction. The outward sweeping radial lip 38 defines an arcuate path having an increasing radius $R_O$ that increases in the clockwise direction. (It will be appreciated that the radius $R_I$ is measured from the center of the opening 16 to the lip 36, and the radius $R_O$ is measured from the center of the opening 16 to the lip 38.) A ramp 40 (FIG. 1) is defined at the groove entrance 32 and leads into the respective grooves 30. In another example, the top 14 may define a constant outer radius without incorporating the inward and outward sweeping radial lips 36 and 38, respectively. It is appreciated that a single groove, or two or more grooves may be provided on the annular sidewall 18. Lands 42 define surfaces formed between the grooves 30 on the annular sidewall 18. A radial channel 46 is formed between the annular sidewall 18 and the support ring 24. As will be described in greater detail later, the radial channel 46 may serve as a means for capturing a break-away, tamper-evidence (TE) band 47 attached to the closure member or cap 12. It is appreciated that the radial channel 46 may also include notches, ratchets or similar geometry for dislodging the break-away, TE band 47 of the closure member or cap 12 during the opening of the container. In another example, the grooves 30 can extend all the way into the radial channel 46 effectively eliminating any terminal end of the grooves 30 (i.e. terminal end 31 discussed above).

The pair of grooves 30 of the finish 10 each define a debossed (grooved) threaded profile around the annular sidewall 18. When compared to traditional injection molded finishes having an embossed (raised) threaded profile, the finish 10 of the present disclosure may represent a material savings of about 15% to about 20% of the overall container weight and more specifically about 50%, in weight, of traditional injection molded finishes. The present disclosure is particularly useful in hot-fill applications where thicker, heavier finishes have been required to withstand the heat generated from hot-fill processes thereby allowing for traditional opening diameters and finish wall thicknesses to be maintained while significantly light weighting the container. Thus, the disclosed finish 10 is capable of withstanding the rigors associated with hot-fill processes, resulting in the same or less distortion as is found in traditional container designs having thicker, heavier finishes.

In another advantage over traditional threaded finish containers, a finish 10 having grooves 30 is more comfortable for a user's mouth to engage and therefore drink from. In this way, a user's mouth can rest more comfortably on a finish free of projecting threads. Furthermore, it is easier for a user to form a seal between their mouth and the finish 10 having grooves 30 as compared to a finish having projecting threads.

A plastic container may be designed to retain a commodity during a thermal process, typically a hot-fill process. For hot-fill bottling applications, bottlers generally fill the container with a liquid or product at an elevated temperature between approximately 155° F. to 205° F. (approximately 68° C. to 96° C.) and seal the container at the finish 10 with the closure member or cap 12 before cooling. In addition, the plastic container may be suitable for other high-temperature pasteurization or retort filling processes or other thermal processes as well.

Figure 3:
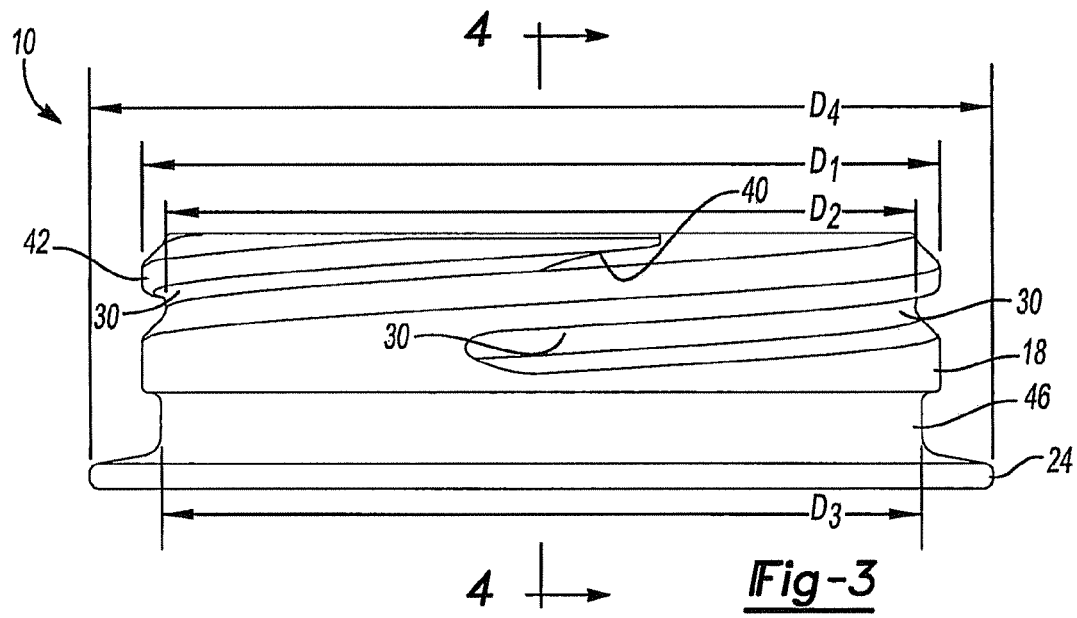
FIG. 3 is a side view of the finish of FIG. 1.
Figure 4:
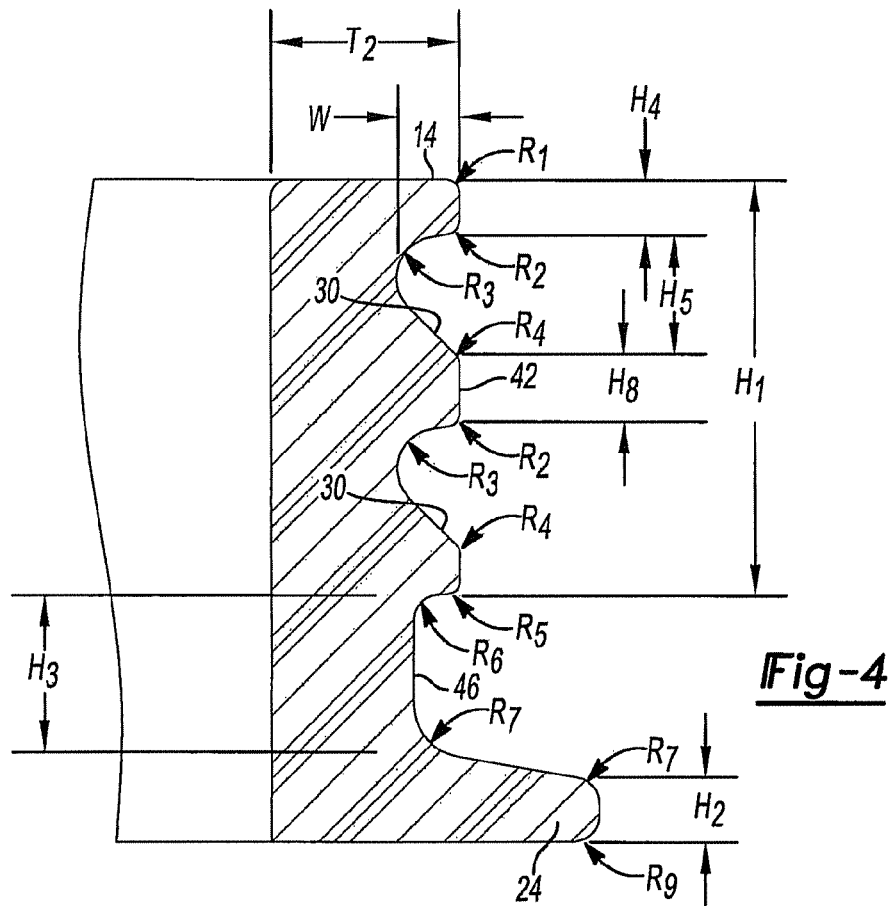
FIG. 4 is a sectional view of the finish taken along line 4-4 of FIG. 3.
Figure 5:
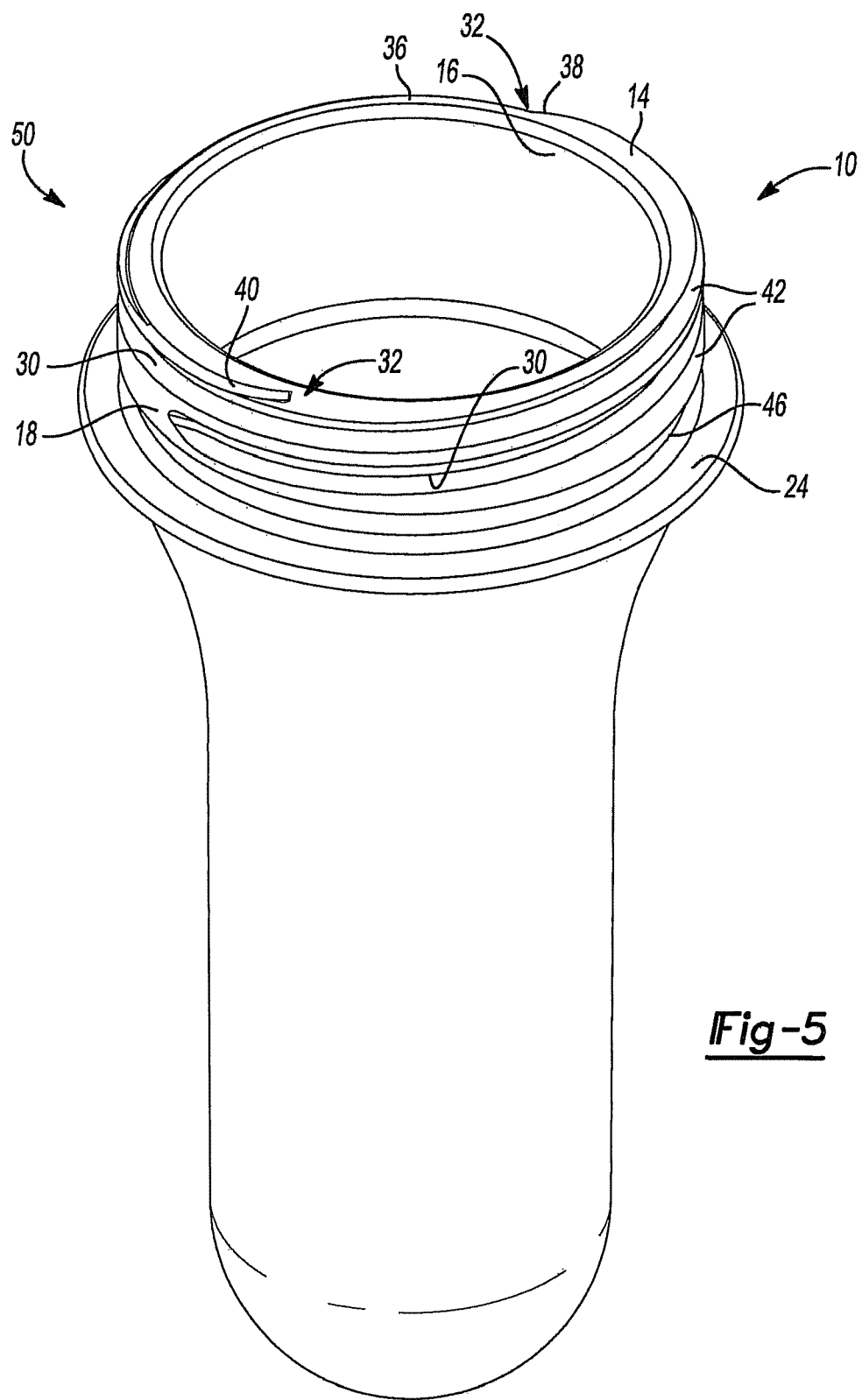
FIG. 5 is a perspective view of a preform used for construction of an exemplary plastic container having the finish of FIG. 1.
Figure 6:
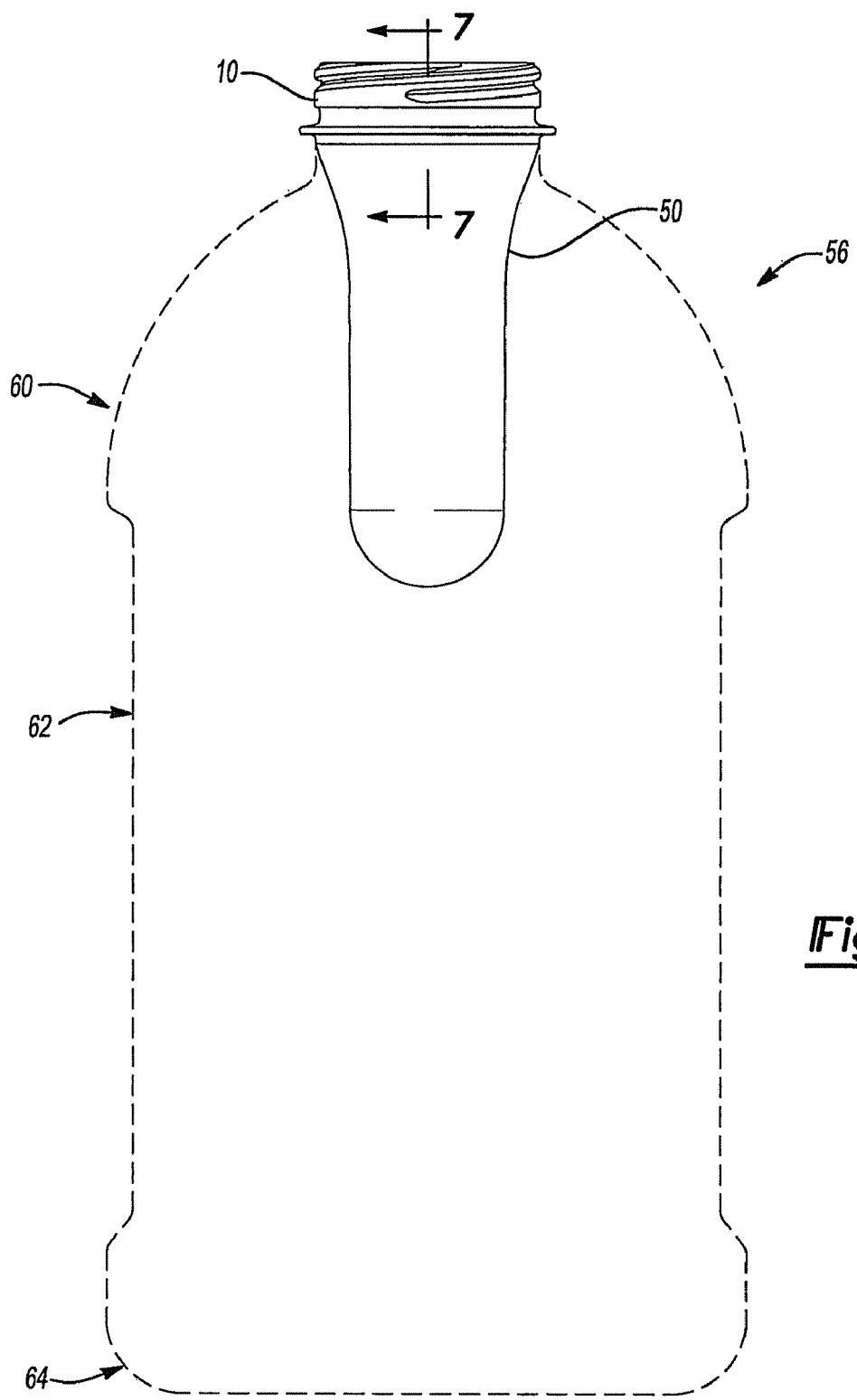
FIG. 6 is a side view of the preform of FIG. 5 shown with an exemplary molded container in phantom.

Turning now to FIGS. 3 and 4, exemplary dimensions for the finish 10 will be described. It is appreciated that other dimensions may be used. A diameter D1 of the finish 10 taken at the lands 42 of the annular sidewall 18 may be 39.24 mm (1.55 inches). A diameter D2 of the finish 10 taken at the grooves 30 of the annular sidewall 18 may be 36.86 mm (1.45 inches). Accordingly, the diameter D2 may be at least 1 mm (0.04 inch) less than the diameter D1. A diameter D3 of the finish 10 taken at the radial channel 46 may be 37.47 mm (1.48 inches). Similarly, the diameter D3 may be at least 1 mm (0.04 inch) less than the diameter D1. As such, the diameter D2 and the diameter D3 may be less than the diameter D1. A diameter D4 of the finish 10 taken at the support ring 24 may be 44.48 mm (1.75 inches). As a result of the reduction in the cap diameter, the diameter D4 is similarly reduced. A height H1 taken from the top 14 to the beginning of the radial channel 46 may be 8.51 mm (0.34 inch). A height H2 of the support ring 24 may be 1.15 mm (0.05 inch). A height H3 of the radial channel 46 may be 3.18 mm (0.13 inch). A height H4 taken from the top 14 to the first groove 30 at the completion of the ramp 40 may be 1 mm (0.04 inch). A height H5, or a height of the groove 30, may be 2.39 mm (0.09 inch). A height H8, or a height of the land 42, may be 1.52 mm (0.06 inch). A seal width W may be 0.82 mm (0.03 inch). In this regard, the seal width W may not be greater than about 50% to about 60% of a wall thickness T2 taken from land 42 to the inner diameter of the opening 16.

With continued reference to FIG. 4, various radii will now be listed with exemplary dimensions. R1, R2, R4 and R5 may be 0.25 mm (0.01 inch). R3 may be 0.76 mm (0.03 inch). R6, R8 and R9 may be 0.51 mm (0.02 inch). R7 may be 1.02 mm (0.04 inch). As such, a minimum dimension for R1, R2, R4, R5, R6, R7 and R9 may be 0.1 mm (0.004 inch). Again, it is appreciated that other dimensions may be used. However, the above-described dimensions provide the closure member or cap 12 with good spin capabilities when engaging the grooves 30.

Turning now to FIGS. 5-8, a preform 50 used to mold an exemplary container having the finish 10 will be described. The plastic container of the present teachings is a blow molded, biaxially oriented container with a unitary construction from a single or multi-layer material. A well-known stretch-molding, heat-setting process for making hot-fillable plastic containers generally involves the manufacture of the preform 50 through injection molding of a polyester material, such as polyethylene terephthalate (PET), having a shape well known to those skilled in the art similar to a test-tube with a generally cylindrical cross section and a length typically approximately fifty percent (50%) that of the resultant container height. A machine (not illustrated) places the preform 50 heated to a temperature between approximately 190° F. to 250° F. (approximately 88° C. to 121° C.) into a mold cavity (not illustrated) having a shape similar to the resultant plastic container.

The mold cavity (not illustrated) may be heated to a temperature between approximately 250° F. to 350° F. (approximately 121° C. to 177° C.). A stretch rod apparatus (not illustrated) stretches or extends the heated preform 50 within the mold cavity to a length approximately that of the resultant container thereby molecularly orienting the polyester material in an axial direction generally corresponding with a central longitudinal axis of the resultant container. While the stretch rod extends the preform 50, air having a pressure between 300 PSI to 600 PSI (2.07 MPa to 4.14 MPa) assists in extending the preform 50 in the axial direction and in expanding the preform 50 in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the container. Typically, material within the finish 10 and a sub-portion of the base are not substantially molecularly oriented. The pressurized air holds the mostly biaxial molecularly oriented polyester material against the mold cavity for a period of approximately two (2) to five (5) seconds before removal of the container from the mold cavity.

Alternatively, other manufacturing methods using other conventional materials including, for example, polypropylene, high density polyethylene, polyethylene naphthalate (PEN), a PET/PEN blend or copolymer, and various multi-layer structures may be suitable for the manufacture of plastic containers. Those having ordinary skill in the art will readily know and understand plastic container manufacturing method alternatives.

The preform 50 may be defined in terms of complementary features of a finished container. For exemplary purposes, a formed container 56 is shown in phantom in FIG. 6. As such, the container 56 may include a shoulder region 60. The shoulder region 60 merges into and provides a transition between the finish 10 and a sidewall portion 62. The sidewall portion 62 extends downward from the shoulder region 60 to a base 64. The base 64 functions to close off the bottom portion of the plastic container 56 and, together with the finish 10, the shoulder region 60, and the sidewall portion 62, to retain the commodity. The specific construction of the shoulder region 60, the sidewall portion 62 and the base 64 are merely exemplary and may vary according to particular applications. The support ring 24 may be used to carry or orient the preform 50 through and at various stages of manufacture. For example, the preform 50 may be carried by the support ring 24, the support ring 24 may be used to aid in positioning the preform 50 in the mold, or an end consumer may use the support ring 24 to carry the plastic container 56 once manufactured.

Figure 7:
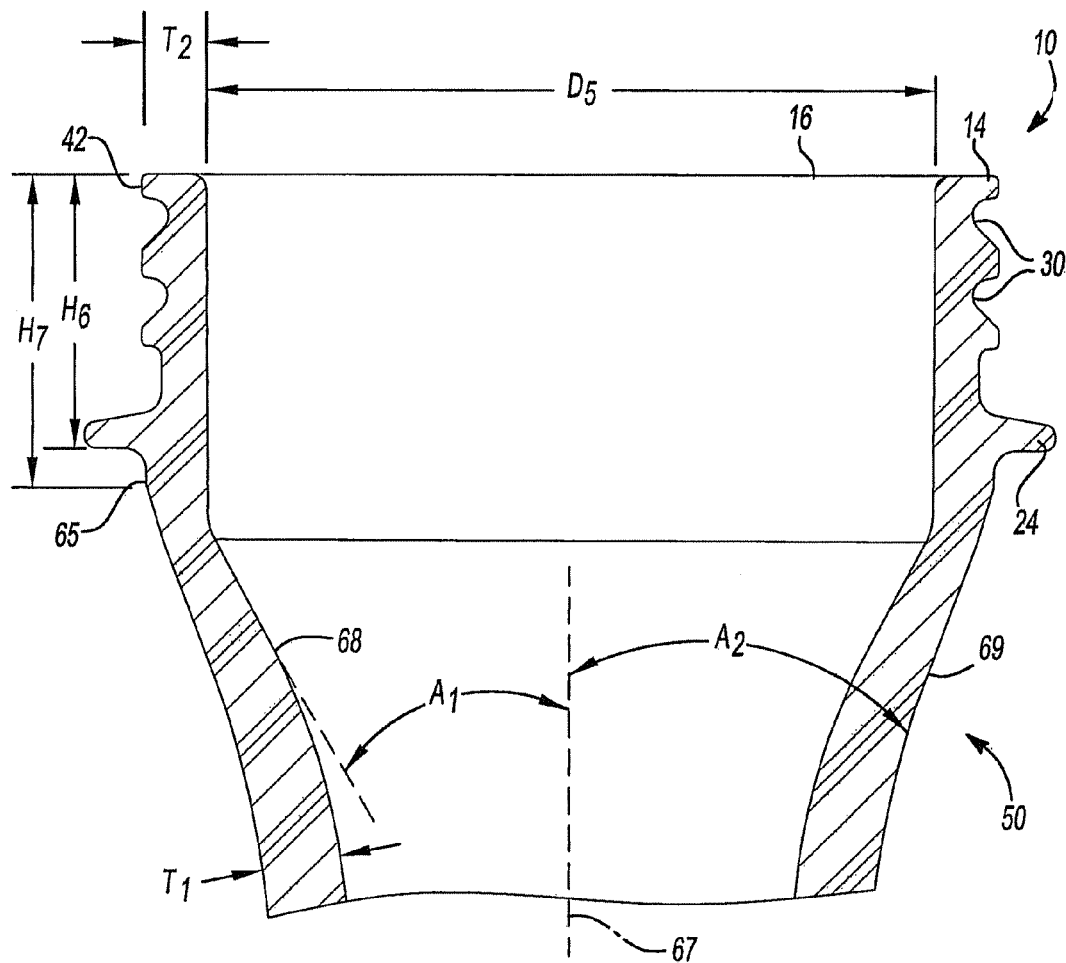
FIG. 7 is a sectional view of the preform taken along line 7-7 of FIG. 6.
Figure 8:
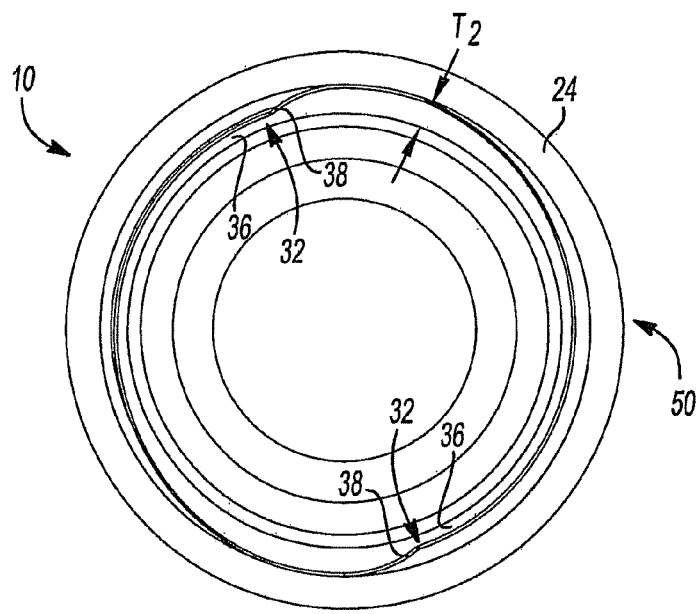
FIG. 8 is a top plan view of the preform of FIG. 5.

With specific reference now to FIGS. 7 and 8, exemplary dimensions for the preform 50 will be described. It is appreciated that the finish 10 of the preform 50 is equivalent to the finish 10 as described in FIGS. 1-4. As such, similar reference numerals will be used to designate like components. An inner diameter D5 of the opening 16 may be 34.08 mm (1.34 inches). A height H6 taken from the top 14 of the finish 10 to the bottom of the support ring 24 may be 13.49 mm (0.53 inch). A height H7 taken from the top 14 of the finish 10 to an onset 6566 of the preform 50 shoulder region may be 14.30 mm (0.56 inch). A wall thickness T1 taken at the preform 50 shoulder region may be 3.62 mm (0.14 inch). The wall thickness T2 taken from land 42 to the inner diameter of the opening 16 may be 2.09 mm (0.08 inch). An angle A1 taken from a longitudinal centerline 67 to an inner wall surface 68 may be 27 degrees. An angle A2 taken from the longitudinal centerline 67 to an outer wall surface 69 may be 20 degrees.

Figure 9:
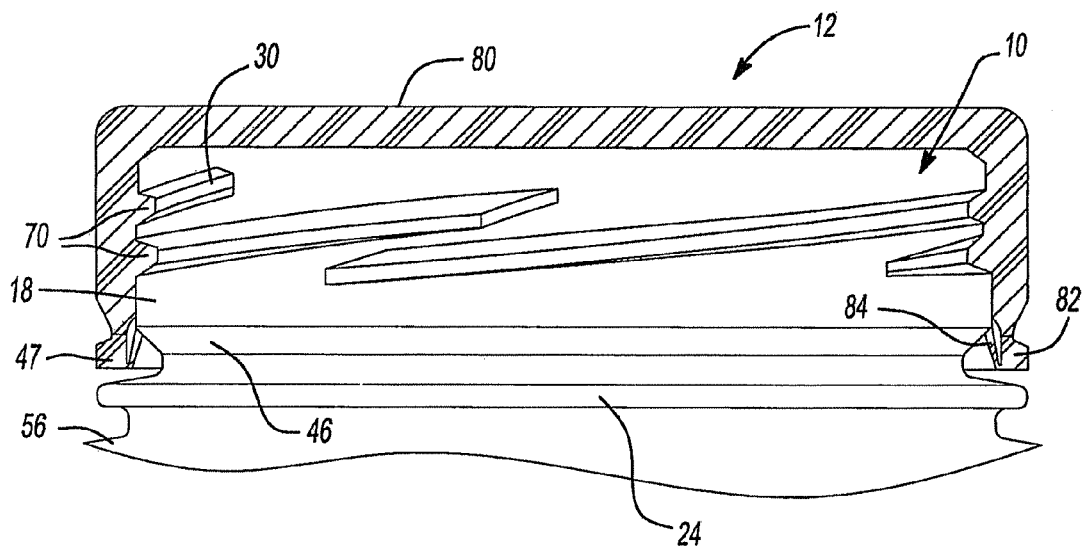
FIG. 9 is a sectional view of a closure member or cap having a tamper-evidence band and constructed in accordance with the teachings of the present disclosure, the cap shown assembled onto the container finish shown in FIG. 1.

With reference to FIG. 9, the closure member or cap 12 is shown engaged to the finish 10 in a closed or assembled position. In the assembled position, the closure member or cap 12 engages the finish 10 to preferably provide a hermetical seal to the plastic container 56. The closure member or cap 12 is preferably of a plastic or metal material suitable for subsequent thermal processing, including high temperature pasteurization and retort. According to the present teachings, the closure member or cap 12 may define raised, outwardly extending threads 70 for rotatably engaging the grooves 30 of the finish 10. In the exemplary finish 10, a two lead configuration is shown. As such, a pair of threads 70 defined on the closure member or cap 12 is adapted to be received by the complementary pair of grooves 30. While two threads 70 are shown in the sectional view of FIG. 9, it is appreciated that one or more than two threads may be provided. To initiate gripping of the threads 70 within the respective grooves 30, the closure member or cap 12 may be placed on the top 14 and rotated until both leads of threads 70 are accepted at the groove entrance 32. The ramp 40 (FIG. 1) progressively directs the respective threads 70 within the grooves 30 as the closure member or cap 12 is rotated in a clockwise direction. As explained above, each of the grooves 30 are defined around approximately 180 degrees to approximately 220 degrees of the annular sidewall 18. To rotate the closure member or cap 12 into a sealed position with the finish 10, the closure member or cap 12 may not need to rotate the entire 180 to 220 degrees. In one example, the threads 70 of the closure member or cap 12 may rotate approximately 160 degrees to approximately 200 degrees around the grooves 30 to attain a sealed position. In other words, each of the embossed (raised) threads 70 of the closure member or cap 12 may be lesser in length than each of the respective grooves 30 of the finish 10. Additionally, the threads 70 of the closure member or cap 12 may be longer than or the same in length as each of the respective grooves 30 of the finish 10 in order to orient the closure member or cap 12 in relation to the container 56. The finish 10, having debossed (inward) grooves 30 of the current disclosure, enables use of a closure member or cap 12 being shorter in height and smaller in diameter than caps currently used with traditional finishes of the same diameter having embossed (raised) threads. In one example, an outer diameter of the closure member or cap 12 can be reduced to about 41 mm (1.61 inches) as compared to a 43 mm (1.69 inches) outer diameter required for an equivalent conventional cap having grooves. Furthermore, as illustrated in FIG. 9, the outer diameter of the closure member or cap 12 can be substantially equivalent to an outer diameter defined at the support ring 24. This represents a significant weight savings, as less material is required for the closure member or cap 12. Accordingly, the finish 10 provides the container 56 with the ability to retain the closure member or cap 12, and withstand the associated application torque while also providing easy removal of the closure member or cap 12.

The closure member or cap 12 is shown with the TE band 47. The closure member or cap 12 can generally include a cover 80 at an upper end. The TE band 47 is further defined by a band body 82 and a flap 84 extending therefrom. The flap 84 extends generally inboard of the band body 82. The TE band 47 of the closure member or cap 12 is designed to ride over the annular sidewall 18 of the finish 10 in a forward (downward) direction when the closure member or cap 12 is initially applied to the container 56. When the closure member or cap 12 is initially unscrewed (moved upward), the flap 84 engages the annular sidewall 18 and therefore breaks away the TE band 47 from the closure member or cap 12. The prevention of the TE band 47 moving back up on the finish 10 when the closure member or cap 12 is removed thus creates the necessary engagement interface and force that effectively removes the TE band 47 from the closure member or cap 12, leaving it on the container finish 10.

While the above description constitutes the present disclosure, it will be appreciated that the disclosure is susceptible to modification, variation and change without departing from the proper scope and fair meaning of the accompanying claims.

What is claimed is:

1. A plastic container having an upper portion, a body portion extending from said upper portion to a base, said base closing off an end of said container; said upper portion, said body portion and said base cooperating to define a receptacle chamber within said container into which product can be filled, said plastic container comprising:

a mouth formed in said upper portion defining an opening into the container; and a radial sidewall of said upper portion defined in part by at least one groove formed therein, said at least one groove sloping gradually downward along said radial sidewall and away from said opening, wherein each of said at least one groove initiates at a groove entrance defined at an intersection between an inward sweeping radial lip and an outward sweeping radial lip.

2. The container of claim 1 wherein said upper portion further comprises:

a radial channel formed adjacent to a lower portion of said radial sidewall.

3. The container of claim 2 wherein said radial sidewall includes a land adjacent said at least one groove on an outer diameter thereof, wherein said radial sidewall defines a wall thickness measured substantially perpendicular to an axis of said opening from said land to an innermost surface of an inner diameter thereof, wherein said radial sidewall also defines a seal width measured substantially perpendicular to said axis of said opening from said land to an innermost surface of said at least one groove, and wherein said seal width of each of said at least one groove is not greater than about 50% to about 60% of said wall thickness.

4. The container of claim 1 wherein each of said at least one groove slopes gradually downward about 180 degrees to about 220 degrees around said radial sidewall.

5. The container of claim 1 wherein said inward sweeping radial lip defines an arcuate path having a decreasing radius in a clockwise direction, said decreasing radius measured from a center of said opening to said inward sweeping radial lip.

6. The container of claim 1 wherein said outward sweeping radial lip defines an arcuate path having an increasing radius in a clockwise direction, said increasing radius measured from a center of said opening to said outward sweeping radial lip.

7. A plastic container assembly comprising:
a plastic container comprising:
a finish having a first radial sidewall and formed at an opening into said container; and
at least one groove formed in said first radial sidewall, said at least one groove initiating at a groove entrance defined at an intersection between an inward sweeping radial lip and an outward sweeping radial lip, said at least one groove sloping gradually away from said opening; and
a closure member adapted to selectively mate with said first radial sidewall of said container, said closure member comprising:
a lower portion defining a closure opening;
an upper portion defining a cover; and
a second radial sidewall extending between said lower portion and said upper portion, said second radial sidewall having an inner surface defined in part by at least one thread formed thereon, said at least one thread adapted to cooperatively engage said at least one groove in an assembled position.

8. The plastic container assembly of claim 7 wherein said second radial sidewall further includes a tamper-evidence band.

9. The plastic container assembly of claim 8 wherein each of said at least one groove slopes gradually downward about 180 degrees to about 220 degrees around said first radial sidewall.

10. The plastic container assembly of claim 7 wherein each of said at least one thread initiates at a thread entrance and slopes gradually toward said cover about 160 degrees to about 200 degrees around said second radial sidewall.

11. The plastic container assembly claim 7 wherein said first radial sidewall includes a land adjacent said at least one groove on an outer diameter thereof, wherein said first radial sidewall defines a wall thickness measured substantially perpendicular to an axis of said opening from said land to an innermost surface of an inner diameter thereof, wherein said first radial sidewall also defines a seal width measured substantially perpendicular to said axis of said opening from said land to an innermost surface of said at least one groove, and wherein said seal width of each of said at least one groove is not greater than about 50% to about 60% of said wall thickness.

12. The plastic container assembly of claim 7 wherein said closure member is formed of one of a plastic and metal material suitable for thermal processing.

13. A preform adapted to be molded into a plastic container, said preform comprising:
 an upper portion having a mouth corresponding to an opening into the container; and
 a radial sidewall of said upper portion defined in part by at least one groove formed therein, said at least one groove sloping gradually downward along said radial sidewall and away from said opening, wherein each of said at least one groove initiates at a groove entrance defined at an intersection between an inward sweeping radial lip and an outward sweeping radial lip.

14. The preform of claim 13 wherein said radial sidewall includes a land adjacent said at least one groove on an outer diameter thereof, wherein said radial sidewall defines a wall thickness measured substantially perpendicular to an axis of said opening from said land to an innermost surface of an inner diameter thereof, wherein said radial sidewall also defines a seal width measured substantially perpendicular to said axis of said opening from said land to an innermost surface of said at least one groove, and wherein said seal width of each of said at least one groove is not greater than about 50% to about 60% of said wall thickness.

15. The preform of claim 13 wherein each of said at least one groove slopes gradually downward about 180 degrees to about 220 degrees around said radial sidewall.

16. The preform of claim 13 wherein said inward sweeping radial lip defines an arcuate path having a decreasing radius in a clockwise direction, said decreasing radius measured from a center of said opening to said inward sweeping radial lip.

17. The preform of claim 13 wherein said outward sweeping radial lip defines an arcuate path having an increasing radius in a clockwise direction, said increasing radius measured from a center of said opening to said outward sweeping radial lip.

18. The preform of claim 13 wherein a first distance measured between an inner wall surface and an outer wall surface is greater than a second distance measured between an inner diameter of said opening and an outer diameter of each of said at least one groove.

19. The preform of claim 13 wherein a first angle measured between a central longitudinal axis and an inner wall surface is greater than a second angle measured between said central longitudinal axis and an outer wall surface.

\* \* \* \* \*

UNITED STATES PATENT AND TRADEMARK OFFICE
CERTIFICATE OF CORRECTION

| | | |
|---|---|---|
| PATENT NO. | : 7,918,356 B2 | |
| APPLICATION NO. | : 11/698009 | |
| DATED | : April 5, 2011 | |
| INVENTOR(S) | : Michael E. Penny | |

It is certified that error appears in the above-identified patent and that said Letters Patent is hereby corrected as shown below:

Column 1, line 8, "2006. The" should be --2006, the--.

Column 6, line 43, "6566," should be --65--.

Column 9, line 1, claim 11, After "assembly", insert --of--.

Signed and Sealed this
Fourteenth Day of June, 2011

David J. Kappos
*Director of the United States Patent and Trademark Office*